United States Patent
Tanaka

(10) Patent No.: US 9,552,180 B2
(45) Date of Patent: Jan. 24, 2017

(54) INFORMATION PROCESSING DEVICE, METHOD AND NON-TRANSITORY COMPUTER-READABLE MEDIUM FOR SELECTING COMMUNICATION INTERFACE ON BASIS OF NUMBER OF TIMES COMMUNICATION INTERFACE REQUEST REJECTED

(71) Applicant: FUJI XEROX CO., LTD., Minato-ku, Tokyo (JP)

(72) Inventor: Tatsuyuki Tanaka, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 0 days.

(21) Appl. No.: 14/489,144

(22) Filed: Sep. 17, 2014

(65) Prior Publication Data

US 2015/0268901 A1 Sep. 24, 2015

(30) Foreign Application Priority Data

Mar. 19, 2014 (JP) .................................. 2014-056943

(51) Int. Cl.
*G06F 3/12* (2006.01)
*H04L 12/803* (2013.01)

(52) U.S. Cl.
CPC ............ *G06F 3/1236* (2013.01); *G06F 3/126* (2013.01); *G06F 3/1212* (2013.01); *G06F 3/1285* (2013.01); *H04L 47/125* (2013.01)

(58) Field of Classification Search
CPC .................................................. G06F 3/1236
See application file for complete search history.

(56) References Cited

U.S. PATENT DOCUMENTS

| 2003/0053125 A1 | 3/2003 | Ohmori | |
| 2005/0280861 A1* | 12/2005 | Shima et al. | 358/1.15 |
| 2010/0027054 A1* | 2/2010 | Reddy | H04L 29/02 358/1.15 |

FOREIGN PATENT DOCUMENTS

| EP | 1 094 639 A2 | 4/2001 |
| JP | 4-326454 A | 11/1992 |
| JP | 06131134 A | 5/1994 |
| JP | 07202943 A | 8/1995 |
| JP | 836473 A | 2/1996 |
| JP | 2000151498 A | 5/2000 |
| JP | 2001-119416 A | 4/2001 |
| JP | 200378650 A | 3/2003 |

(Continued)

OTHER PUBLICATIONS

Machine translation of JP Pub 08-036473 to Masui Takanori.*

(Continued)

*Primary Examiner* — Benny Q Tieu
*Assistant Examiner* — Haris Sabah
(74) *Attorney, Agent, or Firm* — Sughrue Mion, PLLC

(57) ABSTRACT

An information processing device includes multiple communication interfaces, a holding unit, a counting unit, and a processing unit. The holding unit holds requests for the multiple communication interfaces in order for each of the communication interfaces, respectively. The counting unit counts a number of times that a turn to process the requests was not given for each of the communication interfaces. The processing unit selects one of the communication interfaces on the basis of the number of times, and processes the request being held for the selected communication interface.

5 Claims, 5 Drawing Sheets

(56) References Cited

FOREIGN PATENT DOCUMENTS

| | | |
|---|---|---|
| JP | 2005-107818 A | 4/2005 |
| JP | 2007-318497 A | 12/2007 |
| JP | 2007318497 A | 12/2007 |
| JP | 2009-284085 A | 12/2009 |

OTHER PUBLICATIONS

Masui Takanori; "Printer"; JP Pub Date Feb. 6, 1996; JP Pub 08-036473.*
Communication dated Nov. 18, 2014 from the Japanese Patent Office in counterpart application No. 2014-056943.
Communication dated Feb. 24, 2015 from the Japanese Patent Office in counterpart application No. 2014-056943.

* cited by examiner

| COMMUNICATION INTERFACE IDENTIFICATION INFORMATION | DELAY COUNT | PRIORITY |
|---|---|---|
| NWIF1 | 2 | 3 |
| NWIF2 | 1 | 2 |
| NWIF3 | 0 | 1 |
| NWIF4 | 0 | 0 |

INFORMATION PROCESSING DEVICE, METHOD AND NON-TRANSITORY COMPUTER-READABLE MEDIUM FOR SELECTING COMMUNICATION INTERFACE ON BASIS OF NUMBER OF TIMES COMMUNICATION INTERFACE REQUEST REJECTED

CROSS-REFERENCE TO RELATED APPLICATIONS

This application is based on and claims priority under 35 USC 119 from Japanese Patent Application No. 2014-056943 filed Mar. 19, 2014.

BACKGROUND

The present invention relates to an information processing device, an information processing method, and a non-transitory computer-readable medium.

SUMMARY

According to an aspect of the invention, there is provided an information processing device that includes multiple communication interfaces, a holding unit, a counting unit, and a processing unit. The holding unit holds requests for the multiple communication interfaces in order for each of the communication interfaces, respectively. The counting unit counts a number of times that a turn to process the requests was not given for each of the communication interfaces. The processing unit selects one of the communication interfaces on the basis of the number of times, and processes the request being held for the selected communication interface.

BRIEF DESCRIPTION OF THE DRAWINGS

Exemplary embodiments of the present invention will be described in detail based on the following figures, wherein.

DETAILED DESCRIPTION

Hereinafter, exemplary embodiments for carrying out the present invention will be described in accordance with the drawings.

[1. Hardware Configuration of Information Process Device]

Figure 1:
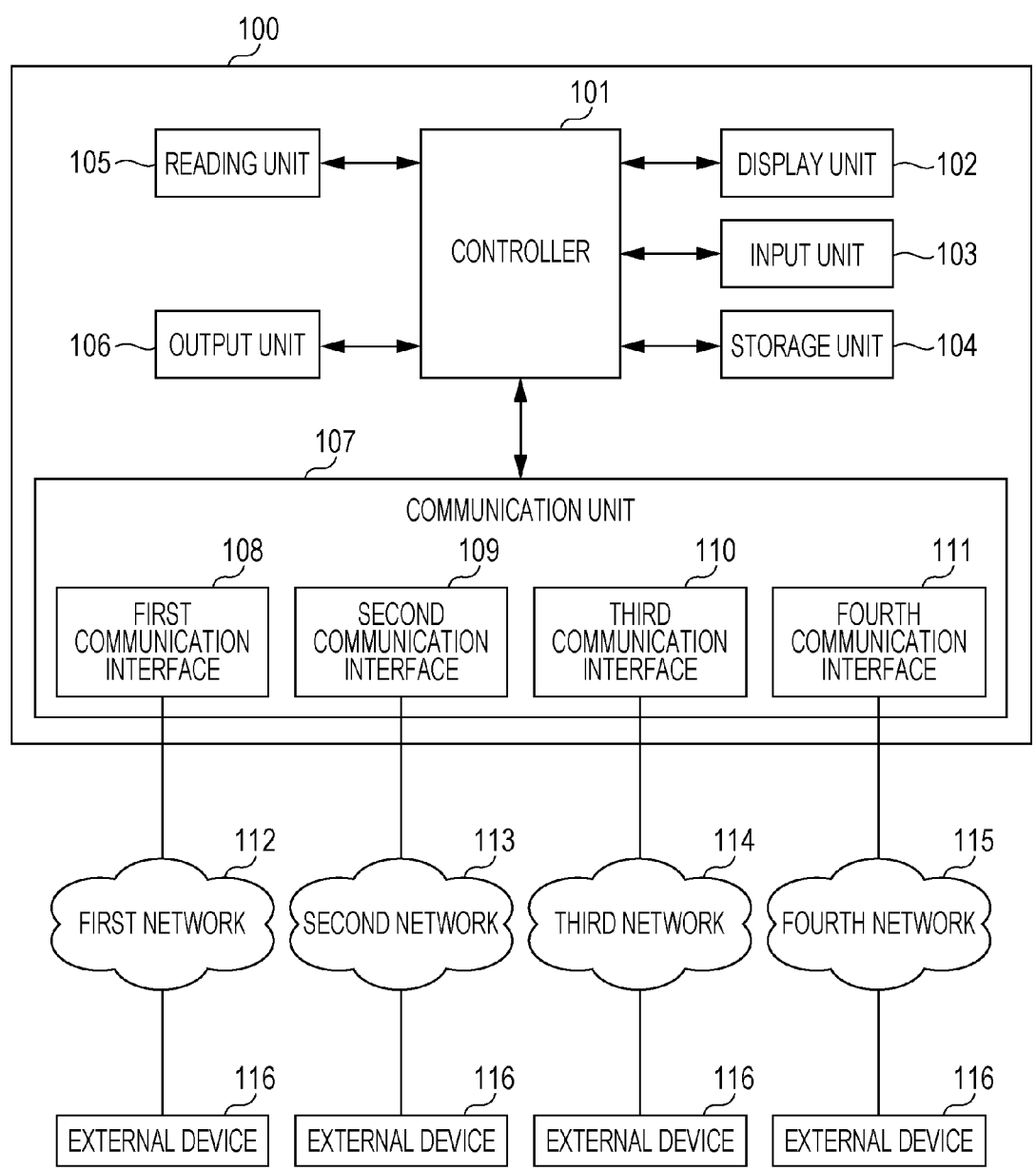
FIG. 1 is a diagram for explaining an example of an information processing device.

FIG. 1 is a diagram illustrating an example of a hardware configuration of an information processing device 100 according to an exemplary embodiment of the present invention, and devices connected to the information processing device 100. As illustrated in FIG. 1, the information processing device 100 includes a controller 101, a display unit 102, an input unit 103, a storage unit 104, a reading unit 105, an output unit 106, and a communication unit 107. Besides the configuration illustrated in FIG. 1, the information processing device 100 may also include components such as an operating unit and a power switch.

The controller 101 includes a central processing unit (CPU), and executes various computational processes while also controlling the respective units of the information processing device 100 on the basis of programs stored in the storage unit 104. The controller 101 will be later discussed in detail.

The display unit 102 is realized by a display device such as a liquid crystal display, and displays the results of information processing by the controller 101 (a screen).

The input unit 103 is realized by an input device such as a touch panel or buttons and keys, and accepts operating input from a user.

The storage unit 104 is made up of an information recording medium such as ROM, RAM, and a hard disk, for example, and is an information recording medium that holds programs executed by the controller 101. In addition, the storage unit 104 operates as work memory for the controller 101, for example. Note that various types of memory are applicable as the storage unit 104. For example, the storage unit 104 may also be realized by a storage device such as semiconductor memory. In addition, the programs and various data described as being stored in the storage unit 104 in the present embodiment may also be acquired from an external device 116 via the communication unit 107, or acquired from an external storage medium.

The reading unit 105 is made up of a scanner or the like. The reading unit 105 reads in an image of a target object by optically scanning a target object such as a sheet of paper.

The output unit 106 is made up of a printing mechanism or the like for forming an image onto a sheet (printing medium) such as paper. The output unit 106 prints (outputs) image data or the like onto a sheet such as paper, on the basis of the controller 101.

The communication unit 107 is made up of multiple communication interfaces, and conducts wired or wireless communication with an external device 116 connected to the information processing device 100. For example, as illustrated in FIG. 1, the communication unit 107 includes a first communication interface 108 to a fourth communication interface 111. Each communication interface is made up of a network interface card (NIC), for example.

Note that although FIG. 1 illustrates the case of the communication unit 107 including four communication interfaces, the number of communication interfaces included in the communication unit 107 may be any number greater than 1. Also, each communication interface included in the communication unit 107 may be a physical interface or a logical interface.

The first network 112 to the fourth network 115 are networks such as a local area network (LAN), the Internet, an intranet, or a next-generation network (NGN). The first network 112 to the fourth network 115 are respectively independent networks, and are not connected to each other.

The external device 116 is made up of a computer or the like. The computer transmits a printing or other instruction to the information processing device 100, for example. Note that the external device 116 may also be a mobile device, server computer, or the like. Additionally, multiple external devices 116 may also be connected to each network.

[2. Functions Realized in Controller]

Figure 2:
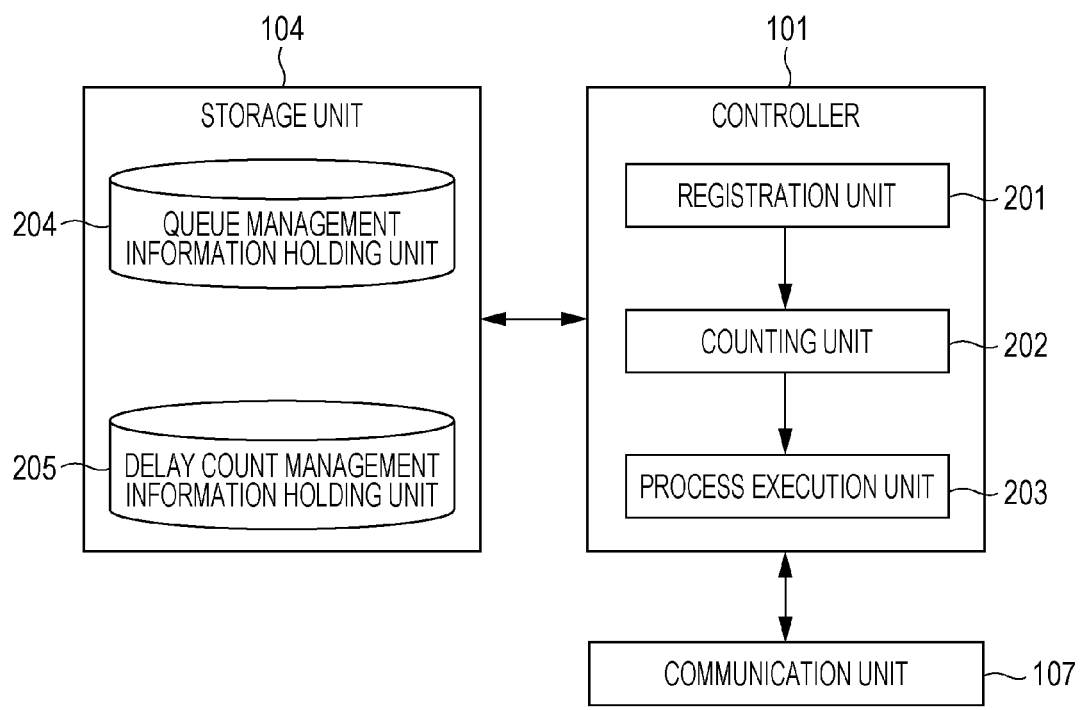
FIG. 2 is a diagram for explaining a function configuration of a controller and a storage unit.

FIG. 2 is a functional block diagram of the controller 101 and the storage unit 104. As illustrated in FIG. 2, the controller 101 functionally includes a registration unit 201, a counting unit 202, and a process execution unit 203. Each function illustrated in FIG. 2 is realized as a result of the controller 101 executing a program stored in the storage unit 104. Additionally, the storage unit 104 functionally includes a queue management information holding unit 204 and a delay count management information holding unit 205.

The registration unit 201 registers connection requests to the queue management information holding unit 204, and a delay count for the delay count management information holding unit 205. The delay count management information holding unit 205 will be later described together with the description of the counting unit 202.

Herein, first, the queue management information holding unit 204 and the queue management information held by the queue management information holding unit 204 will be described. The queue management information holding unit 204 holds connection requests in order for each of the multiple communication interfaces.

Figure 3:
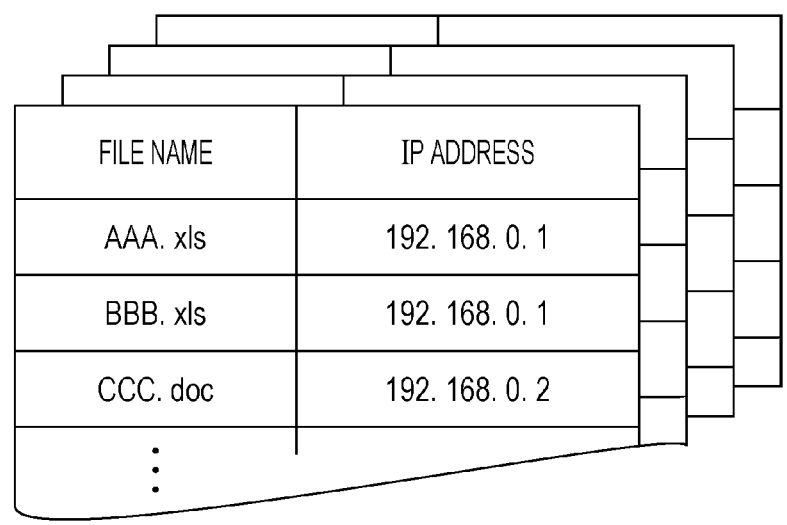
FIG. 3 is a diagram for explaining an example of queue management information.

Specifically, an example of queue management information will be described using the queue management information illustrated in FIG. 3 as an example. As illustrated in FIG. 3, four sets of queue management information corresponding to the four communication interfaces are held in the queue management information holding unit 204. Note that the four sets of queue management information illustrated in FIG. 3 represent queue management information corresponding to the first communication interface 108 to the fourth communication interface 111 in order from the front of the page and proceeding into the page.

Each set of queue management information includes information for identifying an external device 116 and information for identifying the relevant connection request. As a specific example, each set of queue management information includes an IP address for identifying an external device 116, and information related to a file name for identifying the relevant connection request.

In FIG. 3, the queue management information corresponding to the first communication interface 108 holds a connection request that includes the file name "AAA.xls" and the IP address "192.168.0.1". Similarly, the queue management information corresponding to the first communication interface 108 holds a connection request that includes the file name "BBB.xls" and the IP address "192.168.0.1", and a connection request that includes the file name "CCC.doc" and the IP address "192.168.0.2". Note that a connection request held in an upper row of the queue management information is a connection request that was acquired prior to a connection request held in a row below that connection request. In other words, the queue management information illustrated in FIG. 3 indicates that connection requests were acquired in the order of the connection request including the file name "AAA.xls", the connection request including the file name "BBB.xls", and the connection request including the file name "CCC.doc".

Returning to the description of FIG. 2, when each communication interface acquires a connection request, the registration unit 201 registers (enqueues) the acquired connection request on the lowermost row of the queue management information corresponding to the relevant communication interface. Also, when a process in accordance with a connection request is executed, the registration unit 201 removes (dequeues) the connection request corresponding to the executed process from the queue management information holding unit 204, and moves up the rows holding other connection requests.

As a specific example, a case will be described in which connection requests including the file names "AAA.xls" and "BBB.xls" are being stored, and a connection request including the file name "CCC.doc" and the IP address "192.168.0.2" is acquired. In this case, the registration unit 201 enqueues the connection request including the file name "CCC.doc" and the IP address "192.168.0.2" in the queue management information holding unit 204. As a result, the queue management information illustrated in FIG. 3 becomes held in the queue management information holding unit 204.

Furthermore, when a process in accordance with the connection request including the file name "AAA.xls" is executed, the registration unit 201 dequeues the connection request including the file name "AAA.xls" from the queue management information holding unit 204. As a result, queue management information including the file names "BBB.xls" on the second row and "CCC.doc" on the third row becomes held in the queue management information holding unit 204.

The counting unit 202 counts the number of times that a turn to execute a process for a connection request was not given for each of the multiple communication interfaces. As a specific example, if a turn to process is not given to a respective communication interface, the counting unit 202 increments by 1 a delay count held in association with information identifying the relevant communication interface.

The delay count management information will now be described. The delay count management information expresses information associating information that identifies each communication interface, the above delay count, and a priority indicating the priority ranking of the communication interfaces. Note that the priority expresses which communication interface from among communication interfaces with the same delay count has a higher priority for executing a process when the process execution unit 203 discussed later selects a communication interface to execute a process. Also, the priority is information stored in advance in the delay count management information holding unit 205, in association with the communication interface identification information.

Figures 4, 5:
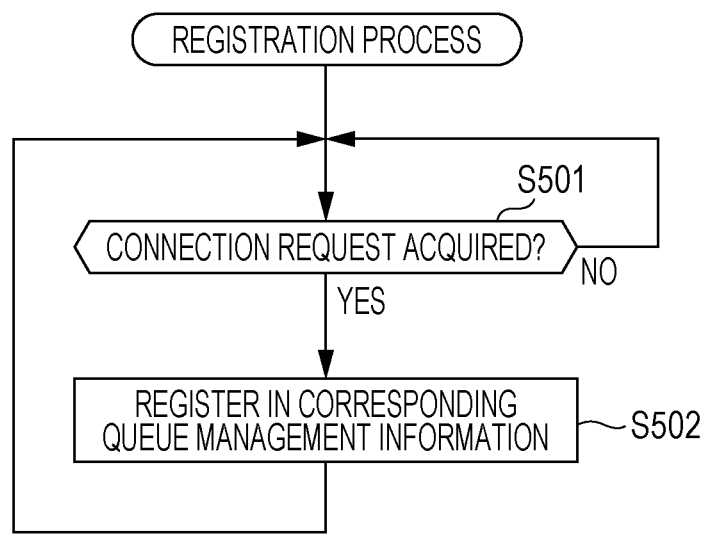
FIG. 4 is a diagram for explaining an example of delay count information.
FIG. 5 is a sequence diagram for explaining a registration process.

Specifically, as illustrated in FIG. 4, for example, the delay count management information is information associating identification information for each communication interface in the first column, the delay count in the second column, and the priority in the third column. The second row in FIG. 4 indicates that the communication interface identification information "NWIF1" identifying the first communication interface 108 is associated with a delay count of "2" and a priority of "3". Similarly, the third to fifth rows respectively indicate communication interface identification information identifying the second communication interface 109 to the fourth communication interface 111, and the delay count and priority corresponding to each communication interface. Note that although FIG. 4 illustrates the case of four communication interfaces, if the number of communication interfaces is other than four, the delay count management information includes communication interface identification information corresponding to the relevant number.

Also, when a turn to execute a process for a connection request is given for each of the multiple communication interfaces, the counting unit 202 keeps a count of 0.

Furthermore, when the counting unit 202 counts a delay count, the registration unit 201 registers the delay count counted by the counting unit 202 in association with information identifying the relevant communication interface in the delay count management information holding unit 205.

On the basis of the delay counts counted by the counting unit 202, the process execution unit 203 selects one of the multiple communication interfaces, and executes a process on the basis of a connection request held for the selected communication interface. In other words, for the communication interface indicated by the communication interface identification information with the largest delay count based on the delay count management information, the process execution unit 203 executes a process on the basis of a connection request included in the queue management information corresponding to that communication interface.

As a specific example, a case in which the queue management information holding unit 204 is holding the queue management information illustrated in FIG. 3 and the delay count management information holding unit 205 is holding the delay count management information illustrated in FIG. 4 will be described. In this case, the communication interface identification information associated with the largest delay count is "NWIF1". Herein, the communication interface indicated by the identification information "NWIF1" is the first communication interface 108. Also, from among the connection requests included in the queue management information corresponding to the first communication interface 108, the connection request that was acquired first is the connection request including the file name "AAA.xls".

Consequently, the process execution unit 203 executes a process based on the connection request including the file name "AAA.xls" for the first communication interface 108. In other words, the first communication interface 108 loads the data with the file name "AAA.xls" from the external device 116 having the IP address "192.168.0.1", and the process execution unit 203 transmits an instruction to print the loaded data or the like to the output unit 106. Note that the content of the process conducted by the process execution unit 203 may also be a process other than a print instruction.

Also, if there exist multiple pieces of communication interface identification information with the largest delay count in the delay count management information, the process execution unit 203 executes a process on the basis of priority. In other words, for the communication interface with the highest priority associated with the relevant multiple pieces of communication interface identification information, the process execution unit 203 executes a process on the basis of a connection request included in the queue management information corresponding to that communication interface.

As a specific example, a case in which the delay count management information holding unit 205 is holding priorities from "3" to "0" in association with communication interface identification information from "NWIF1" to "NWIF4" as illustrated in FIG. 4 will be described. Also, suppose that a delay count of "0" is respectively held in association with the communication interface identification information "NWIF1" to "NWIF4". In this case, the process execution unit 203 executes a process based on the connection request acquired first from among the connection requests included in the queue management information corresponding to the first communication interface 108 indicated by the identification information "NWIF1" associated with the highest priority.

Note that the process execution unit 203 may also determine whether or not a predetermined relationship exists between a connection request processed by a processing unit and a subsequent connection request being held for the communication interface corresponding to the previous connection request, and select one of the multiple communication interfaces on the basis of the determination result. In other words, if consecutive connection requests acquired by the same communication interface exist in a predetermined relationship, the process execution unit 203 may successively process the consecutive connection requests, irrespectively of delay count or priority.

For example, if the IP addresses respectively included in the consecutive connection requests are the same, and the extensions of the file names respectively included in those connection requests are "xls", the process execution unit 203 may determine that the connection requests exist in a predetermined relationship. The process execution unit 203 then consecutively processes the consecutive connection requests.

Specifically, a case in which the queue management information holding unit 204 is holding the queue management information illustrated in FIG. 3 will be described. In this case, the second and third rows of the queue management information corresponding to the first communication interface 108 hold the same IP address "192.168.0.1". In addition, the file names held in the second and third rows both include the extension "xls". Consequently, the process execution unit 203 determines that the second and third rows of the queue management information corresponding to the first communication interface 108 exist in a predetermined relationship. Subsequently, after executing the process of the connection request including the file name "AAA.xls", the process execution unit 203 executes the process of the connection request including the file name "BBB.xls".

Note that the predetermined relationship is not limited to the above relationship, and may also be another relationship. For example, if the IP addresses respectively included in consecutive connection requests are the same, and the files respectively included in those connection requests were created with the same application, the process execution unit 203 may determine that the connection requests exist in a predetermined relationship.

As a specific example, if the IP addresses respectively included in consecutive connection requests are the same, and the extensions of the file names respectively included in those connection requests have a preconfigured relationship, such as "sln" (solution file) and "proj" (project file), the process execution unit 203 may determine that the consecutive connection requests exist in a predetermined relationship. In other words, if consecutive connection requests include the respective extensions "sln" (solution file) and "proj" (project file), it is assumed that those files were created by the same application, such as integrated development environment software. Consequently, the process execution unit 203 may determine that the consecutive connection requests exist in a predetermined relationship.

Also, if the IP addresses respectively included in consecutive connection requests are simply the same, the process execution unit 203 may determine that the connection requests exist in a predetermined relationship. In other words, the queue management information holding unit 204 may determine that consecutive connection requests exist in a predetermined relationship by considering only the IP addresses included in the consecutive connection requests, and not considering relationships among file names or extensions included in the consecutive connection requests.

Furthermore, if the process execution unit 203 determines that a predetermined relationship exists between a connection request processed by the process execution unit 203 and a subsequent connection request being held for the communication interface corresponding to the previous connection request, the process execution unit 203 may consecutively select the same communication interface. Also, the number of times to select the same communication interface consecutively may be limited.

In other words, if the process execution unit 203 has consecutively executed processes a predetermined number of times for connection requests acquired by the same communication interface, the process execution unit 203 may execute a process based on a connection request acquired by another communication interface, irrespectively of the above determination. As a specific example, a case will be described in which ten connection requests including the same IP address and also including files with the extension "xls" are consecutively acquired for one communication interface, and in addition, the predetermined number is five times. In this case, the process execution unit 203 may execute processes based on five out of the ten consecutive connection requests in order of acquisition, and subsequently execute a process based on a connection request acquired by a communication interface different from the above communication interface.

As described above, undesirable switching of the communication interface is moderated by having the process execution unit 203 determine whether or not a predetermined relationship exists between a connection request processed by a processing unit and a subsequent connection request being held for the communication interface corresponding to the previous connection request.

Note that in the case in which the process execution unit 203 is configured to determine whether or not consecutive connection requests exist in a predetermined relationship, the communication unit 107 may also include a single communication interface.

[3. Processes Executed in Information Processing Device]

[3-1. Queue Management Information Registration Process]

Next, processes conducted by the information processing device 100 will be described. FIG. 5 is a sequence diagram for explaining a queue management information registration process conducted by the information processing device 100.

First, the process branches depending on whether or not a communication interface included in the communication unit 107 acquires a connection request from an external device 116 (S501). In S501, if no communication interface has acquired a connection request, the process proceeds to S501 again. In other words, the step in S501 is repeated until a communication interface acquires a connection request.

On the other hand, in S501, if a communication interface acquires a connection request, the registration unit 201 registers the acquired connection request in the queue management information corresponding to the acquiring communication interface.

As above, every time a communication interface acquires a connection request, that connection request is registered in the queue management information corresponding to the acquiring communication interface.

[3-2. Connection Request Process]

Figure 6:
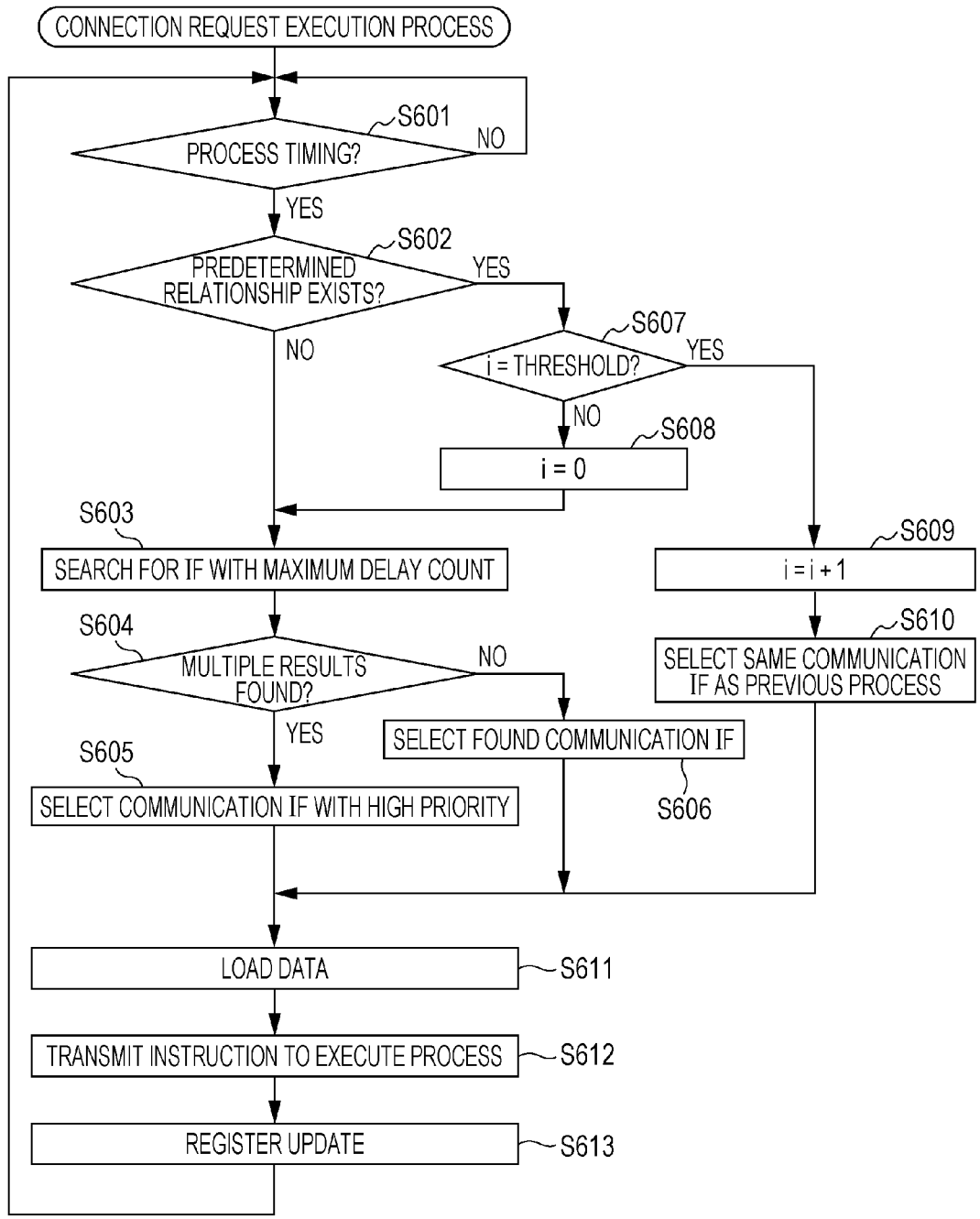
FIG. 6 is a sequence diagram for explaining a connection request execution process.

FIG. 6 is a sequence diagram for explaining a connection request process conducted by the information processing device 100. First, the process branches depending on whether or not the information processing device 100 is at a timing to conduct a process based on a connection request (S601). In S601, if not at a timing to conduct a process, the process proceeds to S601 again. In other words, the step in S601 is repeated until a timing to conduct a process is reached.

Subsequently, the process execution unit 203 determines whether or not a predetermined relationship exists between a connection request processed by a processing unit and a subsequent connection request being held for the communication interface corresponding to the previous connection request (S602). In S602, the process proceeds to S603 if the process execution unit 203 determines that a predetermined relationship does not exist, and proceeds to S607 if the process execution unit 203 determines that a predetermined relationship exists.

In S602, if the process execution unit 203 determines that a predetermined relationship does not exist, the process execution unit 203 searches for the communication interface with the largest delay count on the basis of the delay count management information (S603). Next, if there exist multiple pieces of communication interface identification information with the largest delay count management information, the process execution unit 203 selects the communication interface with the highest priority associated with the relevant multiple pieces of communication interface identification information (S604, S605). On the other hand, if there exists one piece of communication interface identification information with the largest delay count in the delay count management information, the process execution unit 203 selects the one relevant communication interface (S606).

Also, in S602, if the process execution unit 203 determines that a predetermined relationship exists, the process proceeds to S608 if the number of processes consecutively conducted by the process execution unit 203 (i in the drawing) matches a predetermined threshold value, and proceeds to S609 if i does not exceed the predetermined threshold value (S607). In the case of proceeding to S608, the number of processes consecutively conducted by the process execution unit 203 is reset (S608). After that, the process proceeds to S603, and the information processing device 100 conducts a process similar to the above.

On the other hand, in the case of proceeding to S609, the number of processes consecutively executed by the process execution unit 203 is incremented by 1 (S609). The process execution unit 203 then selects the communication interface on which the process execution unit 203 executed the past process (S610).

Subsequently, the communication interface selected in one of S605, S606, and S610 loads data on the basis of a connection request held in the corresponding queue management information holding unit 204 (S611). Next, the process execution unit 203 executes a process based on the loaded data (S612). The counting unit 202 then counts delay counts corresponding to each communication interface, and the registration unit 201 registers updates in the queue management information holding unit 204 and the delay count management information (S613).

Note that the above describes a case of combining a feature in which the process execution unit 203 determines whether or not consecutive connection requests exist in a predetermined relationship with a feature in which the counting unit 202 counts a delay count for each communication interface, in order to moderate undesirable switching of the communication interface. However, features other than the above may also be combined.

[3-3. Specific Example of Connection Request Process]

Figure 7:
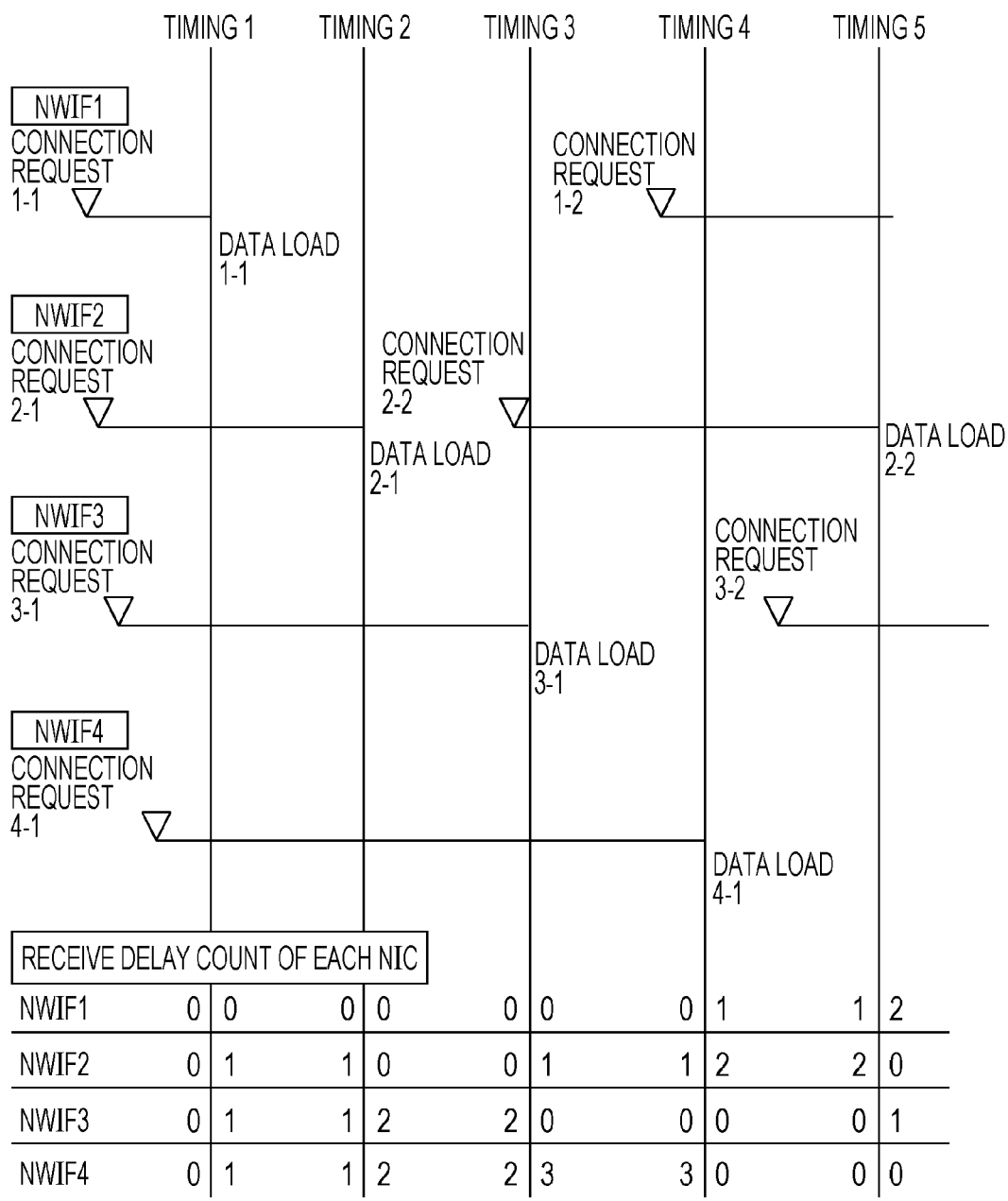
FIG. 7 is a diagram for explaining a specific example of a process conducted by an information processing device.

Next, a specific example of the above connection request execution process will be described. FIG. 7 is a diagram for explaining a specific example of a process conducted by the information processing device 100. Herein, suppose that the information processing device 100 includes four communication interfaces assigned with identification information from NWIF1 to NWIF4, and that NWIF1 to NWIF4 are respectively associated with the priorities illustrated in FIG. 4. Also, the following description herein supposes that the process execution unit 203 does not determine whether or not a predetermined relationship exists between a connection request processed by a processing unit and a subsequent connection request being held for the communication interface corresponding to the previous connection request.

The upper part of FIG. 7 illustrates timings when each communication interface acquires a connection request, and timings when the communication interfaces execute data loading on the basis of those connection requests. Also, the timings 1 to 5 respectively indicate the timings when the information processing device 100 conducts a process on the basis of a connection request. Furthermore, the downward-facing triangles represent the timings when each communication interface acquires a connection request, while the lines extending to the right from the triangles represent the period until data loading is executed. In other words, the end of a line indicates the timing when data loading is executed on the basis of the relevant connection request. The lower part of FIG. 7 illustrates delay counts corresponding to each communication interface (NIC) held in the delay count management information holding unit 205 before and after the timings 1 to 5.

First, before timing 1, the first communication interface 108 acquires the connection request labeled "connection request 1-1". Subsequently, the second communication interface 109 to the fourth communication interface 111 successively acquire connection requests labeled "connection request 2-1", "connection request 3-1", and "connection request 4-1", respectively. At the timing when the fourth communication interface 111 acquires the connection request labeled "connection request 4-1", the delay counts corresponding to NWIF1 to NWIF4 held in the delay count management information holding unit 205 are all "0".

Next, when timing 1 is reached, since the delay counts corresponding to the first communication interface 108 to the fourth communication interface 111 are all the same, the first communication interface 108 having the highest priority ranking from among the first communication interface 108 to the fourth communication interface 111 loads data on the basis of the connection request labeled "connection request 1-1" (data load 1-1). The process execution unit 203 then executes a process based on the loaded data. Additionally, the counting unit 202 counts a delay count of 0 for the delay count corresponding to NWIF1. Furthermore, the registration unit 201 registers a delay count of "0" in association with NWIF1 in the delay count management information holding unit 205.

At timing 1, the second communication interface 109 to the fourth communication interface 111 respectively acquire connection requests, but the process execution unit 203 does not execute processes based on each connection request for the second communication interface 109 to the fourth communication interface 111. For this reason, the counting unit 202 increments the delay counts stored in association with NWIF2 to NWIF4 by 1. Subsequently, the registration unit 201 registers the delay count of "1" incremented by the counting unit 202 in association with NWIF2 to NWIF4 in the delay count management information holding unit 205.

Consequently, as illustrated in the lower part of FIG. 7, after timing 1, the delay count corresponding to NWIF1 held in the delay count management information holding unit 205 becomes "0", while the delay counts corresponding to NWIF2 to NWIF4 all become "1".

Next, when timing 2 is reached, the communication interfaces associated with the largest delay count from among the first communication interface 108 to the fourth communication interface 111 are the second communication interface 109 to the fourth communication interface 111. Accordingly, the second communication interface 109 having the highest priority ranking from among the second communication interface 109 to the fourth communication interface 111 loads data on the basis of the connection request labeled "connection request 2-1" (data load 2-1). The process execution unit 203 then executes a process based on the loaded data. Additionally, the counting unit 202 counts a delay count of 0 for the delay count corresponding to NWIF2. Furthermore, the registration unit 201 registers a delay count of "0" in association with NWIF2 in the delay count management information holding unit 205.

Also, at timing 2, the third communication interface 110 and the fourth communication interface 111 respectively acquire connection requests, but the process execution unit 203 does not execute processes based on each connection request for the third communication interface 110 and the fourth communication interface 111. For this reason, the counting unit 202 increments the delay counts stored in association with NWIF3 and NWIF4 by 1. Subsequently, the registration unit 201 registers the delay count of "2" incremented by the counting unit 202 in association with NWIF3 and NWIF4 in the delay count management information holding unit 205.

Consequently, as illustrated in the lower part of FIG. 7, after timing 2, the delay counts corresponding to NWIF1 and NWIF2 held in the delay count management information holding unit 205 become "0", while the delay counts corresponding to NWIF3 and NWIF4 become "2".

Subsequently, after timing 2 but before timing 3, the second communication interface 109 acquires the connection request labeled "connection request 2-2".

Next, when timing 3 is reached, the communication interfaces associated with the largest delay count from among the first communication interface 108 to the fourth communication interface 111 are the third communication interface 110 and the fourth communication interface 111. Accordingly, the third communication interface 110 having the highest priority ranking from among the third communication interface 110 and the fourth communication interface 111 loads data on the basis of the connection request labeled "connection request 3-1" (data load 3-1). The process execution unit 203 then executes a process based on the loaded data. Additionally, the counting unit 202 counts a delay count of 0 for the delay count corresponding to NWIF3. Furthermore, the registration unit 201 registers a delay count of "0" in association with NWIF3 in the delay count management information holding unit 205.

Also, at timing 3, the second communication interface 109 and the fourth communication interface 111 respectively acquire connection requests, but the process execution unit 203 does not execute processes based on each connection request for the second communication interface 109 and the fourth communication interface 111. For this reason, the counting unit 202 increments the delay counts stored in association with NWIF2 and NWIF4 by 1. Subsequently, the registration unit 201 registers the delay count of "1" incremented by the counting unit 202 in association with NWIF2 in the delay count management information holding unit 205, and registers the delay count of "3" incremented by the counting unit 202 in association with NWIF4.

Consequently, as illustrated in the lower part of FIG. 7, after timing 3, the delay counts corresponding to NWIF1 to NWIF4 held in the delay count management information holding unit 205 respectively become "0", "1", "0", and "3" in order.

Subsequently, after timing 3 but before timing 4, the first communication interface 108 acquires the connection request labeled "connection request 1-2".

Next, when timing 4 is reached, the communication interface associated with the largest delay count from among the first communication interface 108 to the fourth communication interface 111 is the fourth communication interface 111. Accordingly, the fourth communication interface 111 loads data on the basis of the connection request labeled "connection request 4-1" (data load 4-1). The process execution unit 203 then executes a process based on the loaded data. Additionally, the counting unit 202 counts a delay count of 0 for the delay count corresponding to NWIF4. Furthermore, the registration unit 201 registers a delay count of "0" in association with NWIF4 in the delay count management information holding unit 205.

Also, at timing 4, the first communication interface 108 and the second communication interface 109 respectively acquire connection requests, but the process execution unit 203 does not execute processes based on each connection request for the first communication interface 108 and the second communication interface 109. For this reason, the counting unit 202 increments the delay counts stored in association with NWIF1 and NWIF2 by 1. Subsequently, the registration unit 201 registers the delay count of "1" incremented by the counting unit 202 in association with NWIF1 in the delay count management information holding unit 205, and registers the delay count of "2" incremented by the counting unit 202 in association with NWIF2.

Consequently, as illustrated in the lower part of FIG. 7, after timing 4, the delay counts corresponding to NWIF1 to NWIF4 held in the delay count management information holding unit 205 respectively become "1", "2", "0", and "0" in order.

Subsequently, after timing 4 but before timing 5, the third communication interface 110 acquires the connection request labeled "connection request 3-2".

Next, when timing 5 is reached, the communication interface associated with the largest delay count from among the first communication interface 108 to the fourth communication interface 111 is the second communication interface 109. Accordingly, the second communication interface 109 loads data on the basis of the connection request labeled "connection request 2-2" (data load 2-2). The process execution unit 203 then executes a process based on the loaded data. Additionally, the counting unit 202 counts a delay count of 0 for the delay count corresponding to NWIF2. Furthermore, the registration unit 201 registers a delay count of "0" in association with NWIF2 in the delay count management information holding unit 205.

Also, at timing 5, the first communication interface 108 and the third communication interface 110 respectively acquire connection requests, but the process execution unit 203 does not execute processes based on each connection request for the first communication interface 108 and the third communication interface 110. For this reason, the counting unit 202 increments the delay counts stored in association with NWIF1 and NWIF3 by 1. Subsequently, the registration unit 201 registers the delay count of "2" incremented by the counting unit 202 in association with NWIF1 in the delay count management information holding unit 205, and registers the delay count of "1" incremented by the counting unit 202 in association with NWIF3.

Consequently, as illustrated in the lower part of FIG. 7, after timing 5, the delay counts corresponding to NWIF1 to NWIF4 held in the delay count management information holding unit 205 respectively become "2", "0", "1", and "0" in order.

Note that although the specific example above describes the operation of the information processing device 100 during the period from the timings 1 to 5, the information processing device 100 conducts a process similar to the above for periods other than the above. Also, although the case of four communication interfaces is described, the communication interfaces may be a number other than four. Furthermore, the process execution unit 203 may also be configured to determine whether or not a predetermined relationship exists between a connection request processed by a processing unit and a subsequent connection request being held for the communication interface corresponding to the previous connection request.

The present invention is not limited to the foregoing exemplary embodiments or exemplary modifications, and various other modifications are possible. The configuration of the information processing device 100 and the flowcharts are merely examples, and the present invention is not limited thereto. The configurations illustrated in the foregoing exemplary embodiments or exemplary modifications may also be substituted with a configuration that is substantially the same, a configuration that exhibits the same operational effects, or a configuration that achieves the same objective.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An information processing device comprising:
   a plurality of communication interfaces;
   a storage that stores connection requests for the plurality of communication interfaces in order for each of the plurality of communication interfaces, respectively; and
   a controller that counts, for each of the plurality of communication interfaces, a number of times that a turn to process a connection request from the communication interface was not given, selects one of the plurality of communication interfaces on a basis of the counts of the number of times for the communication interfaces, and processes the connection request being held for the selected communication interface,
   wherein the controller determines whether a relationship exists between the connection request that is being processed and a subsequent connection request that is stored in the storage for the selected communication interface of the connection request that is being processed, and selects one of the plurality of communication interfaces on the basis of the determination result.

2. The information processing device according to claim 1, wherein if the controller determines that the relationship exists, the controller consecutively selects same communication interface for processing the subsequent connection request as is being used for the connection request that is being processed.

3. The information processing device according to claim 2, wherein the controller determines whether the number of times to select a same communication interface consecutively is greater than a threshold number, and if the number of times is greater than the threshold number, selects another one of the plurality of communication interfaces.

4. An information processing method for controlling an information processing device comprising:
　　storing connection requests for a plurality of communication interfaces in order for each of the plurality of communication interfaces; respectively;
　　counting, for each of the plurality of communication interfaces; a number of times that a turn to process a connection request from the communication interface was not given; and
　　selecting one of the plurality of communication interfaces on a basis of the counts of the number of times for the communication interfaces, and processing the connection request being held for the selected communication interface,
　　wherein the selecting further comprises determining whether a relationship exists between the connection request that is being processed and a subsequent connection request that is stored for the selected communication interface of the connection request that is being processed, and selects the one of the plurality of communication interfaces on the basis of the determination result.

5. A non-transitory computer readable medium storing a program causing a computer to execute a process for processing information, the process comprising:
　　storing connection requests for a plurality of communication interfaces in order for each of the plurality of communication interfaces, respectively;
　　counting, for each of the plurality of communication interfaces, a number of times that a turn to process a connection request from the communication interface was not given; and
　　selecting one of the plurality of communication interfaces on a basis of the counts of the number of times for the communication interfaces, and processing the connection request being held for the selected communication interface,
　　wherein the selecting further comprises determining whether a relationship exists between the connection request that is being processed and a subsequent connection request that is stored for the selected communication interface of the connection request that is being processed, and selects the one of the plurality of communication interfaces on the basis of the determination result.

\* \* \* \* \*